United States Patent
Ohkubo

(10) Patent No.: US 8,166,089 B2
(45) Date of Patent: Apr. 24, 2012

(54) SAMPLED DATA AVERAGING CIRCUIT

(75) Inventor: Masahiko Ohkubo, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 1281 days.

(21) Appl. No.: 11/878,663

(22) Filed: Jul. 26, 2007

(65) Prior Publication Data
US 2008/0059550 A1 Mar. 6, 2008

(30) Foreign Application Priority Data

Sep. 5, 2006 (JP) ................................ 2006-240347

(51) Int. Cl.
*G06F 7/38* (2006.01)
(52) U.S. Cl. ...................................... 708/445
(58) Field of Classification Search .................... 708/445
See application file for complete search history.

(56) References Cited

U.S. PATENT DOCUMENTS

| | | | | |
|---|---|---|---|---|
| 5,068,818 A | * | 11/1991 | Uramoto et al. | 708/445 |
| 5,448,508 A | * | 9/1995 | Ono et al. | 708/445 |

FOREIGN PATENT DOCUMENTS

JP 05-314165 11/1993

* cited by examiner

*Primary Examiner* — Chuong D Ngo
(74) *Attorney, Agent, or Firm* — Studebaker & Brackett PC; Donald R. Studebaker

(57) ABSTRACT

A sampled data averaging circuit which comprises sampling means for sampling input data at predetermined timing by a number of sampling times set, division means for dividing the sampled data by the number of sampling times for each time the input data is sampled, and accumulation means for sequentially accumulating the division result, and an average value is obtained from the accumulation result of the accumulation means.

8 Claims, 21 Drawing Sheets

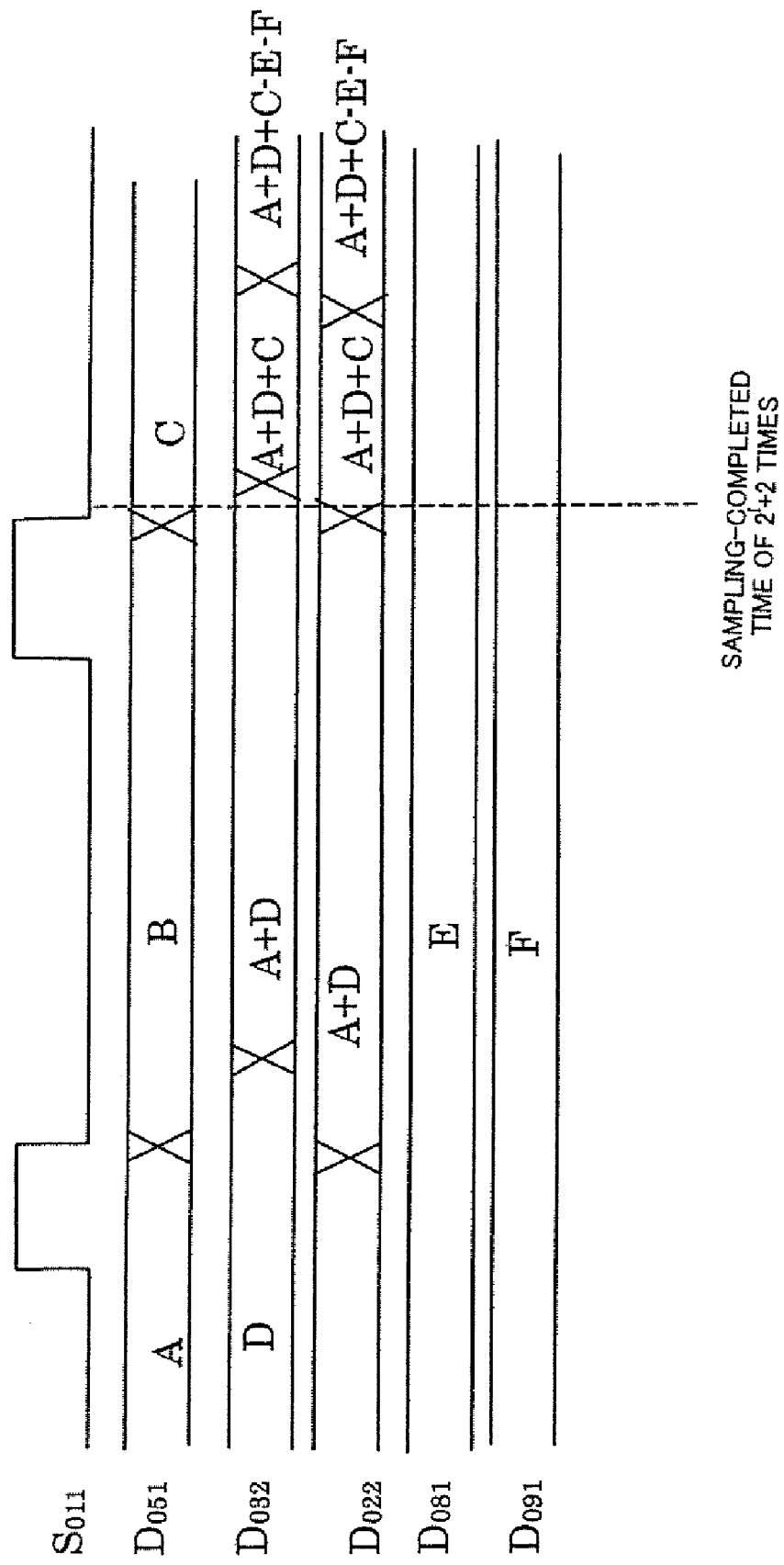

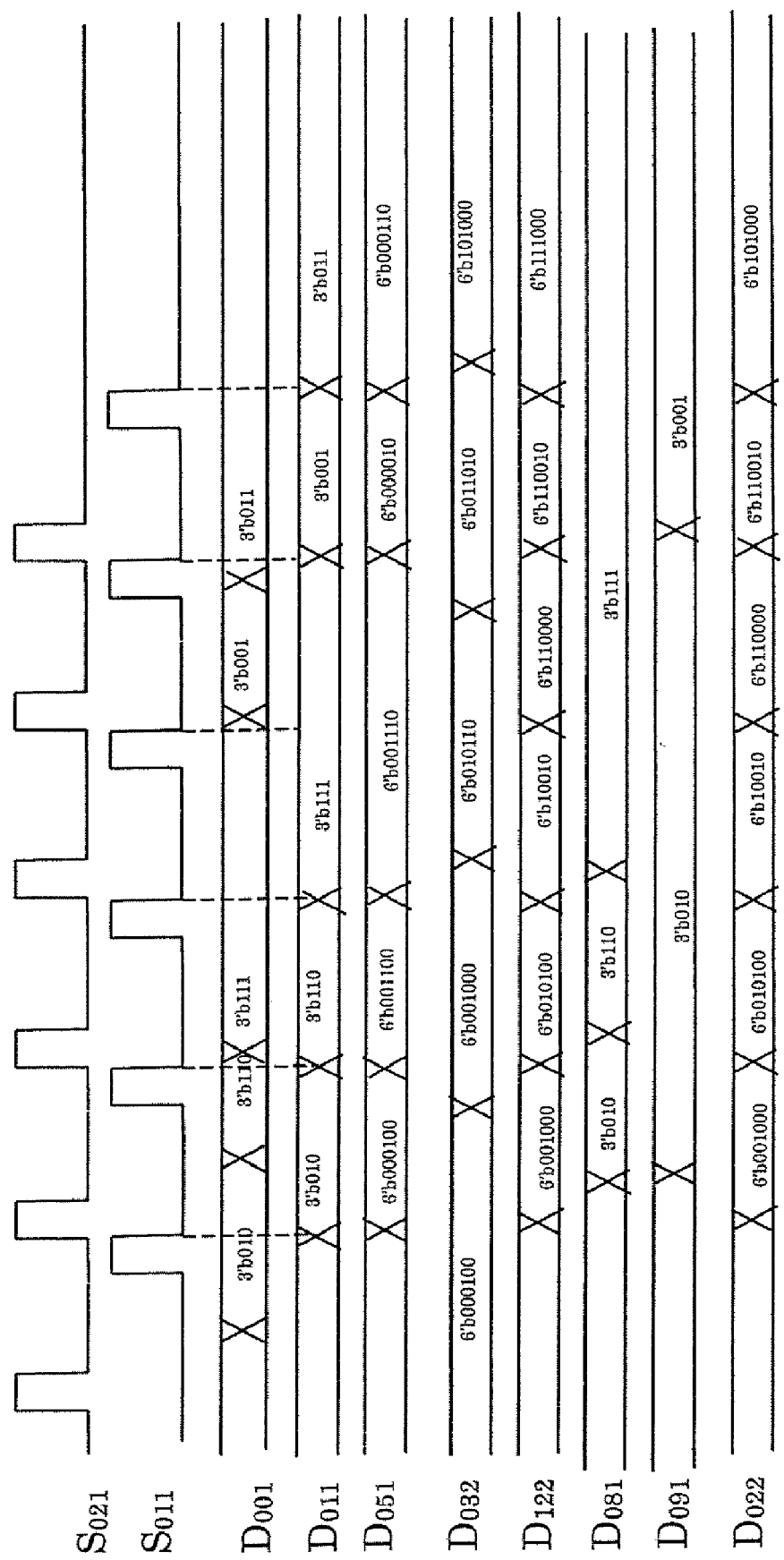

SAMPLED DATA AVERAGING CIRCUIT

BACKGROUND OF THE INVENTION

1. Field of the Invention

The present invention relates to a sampled data averaging circuit for sampling input data a plurality of times and calculating an average value of the sampled data.

2. Description of the Related Art

A conventional sampled data averaging circuit comprises for example a sampling circuit 1, a data addition circuit 2, a sampling command circuit 3, and a sampled data storage circuit 4, as shown in FIG. 1. Suppose that the number of samplings is 2M, and that a sampled data has a bit width of N bits. The sampling circuit 1 takes as inputs input data $D_{001}$ with a bit width of N bits and a sampling-start flag $S_{021}$, and outputs a sampling-completed flag $S_{011}$ and output data $D_{011}$ with a bit width of N bits. The input data $D_{001}$ is data to be sampled, which changes with time.

As shown in FIG. 2, the sampling circuit 1 comprises a counter 11, a comparator 12, N bits' worth of AND circuits 13[0] to 13[N−1], and flip-flops (FFs) 14 and 15[0] to 15[N−1]. The counter 11 begins counting up in response to the rising edge of the sampling start flag $S_{021}$, and outputs a count value as $D_{111}$. The counting-up by the counter 11 is halted when the comparison output $S_{111}$ of the comparator 12 is set as a flag, and the count value is returned to the initial value. The comparator 12 compares the count value $D_{111}$ of the counter 11 with a fixed value $D_{112}$, and when the values of $D_{111}$ and $D_{112}$ are equal to each other, sets the flag $S_{111}$. The comparison output $S_{111}$ of the comparator 12 is output to the AND circuits 13[0] to 13[N−1] and to the FF 14.

The AND circuits 13[0] to 13[N−1] calculate the logical products of the comparison output $S_{111}$ of the comparator 12 with the N bits of input data $D_{001[0]}$ to $D_{001[N−1]}$, and output the calculated results to the FFs 15[0] to 15[N−1] as data $D_{113[0]}$ to $D_{113[N−1]}$.

A clock pulse and a reset pulse are supplied to the FFs 14 and 15[0] to 15[N−1]. The FF 14 captures a value of the comparison output $S_{111}$ of the comparator 12 in sync with the clock pulse, and outputs the operated results as a sampling-completed flag $S_{011}$. The FFs 15[0] to 15[N−1] capture and hold the output data $D_{113[0]}$ to $D_{113[N−1]}$ of the AND circuits 13[0] to 13[N−1] in sync with the clock pulse, and output the operated results as data $D_{011[0]}$ to $D_{011[N−1]}$ The $D_{011[0]}$ to $D_{011[N−1]}$ are output data $D_{011}$ from the sampling circuit 1, that is, sampled data.

As shown in FIG. 3, the data addition circuit 2 has an adder 21 and a selector 22. The adder 21 performs addition of N bits (where N is an integer greater than or equal to 1), adds the N bits of output data $D_{011}$ of the sampling circuit 1 with N+M bits (where M is an integer greater than or equal to 1) of output data $D_{031}$ of the sampled data storage circuit 4, and outputs the added result to the selector 22 as data $D_{121}$. The selector 22 outputs, as N+M bit data $D_{021}$, one of the output data $D_{031}$ of the sampling command circuit 3 and the output data $D_{121}$ of the adder 21, in accordance with the sampling-completed flag $S_{011}$ from the FF 14. That is, when the sampling-completed flag $S_{011}$ is 0, the data $D_{031}$ is output as $D_{021}$, and when the sampling-completed flag $S_{011}$ is 1, the data $D_{121}$ is output as $D_{021}$.

As shown in FIG. 4, the sampling command circuit 3 has AND circuits 31, 32, a storage circuit 33, a counter 34, and a comparator 35. The AND circuit 31 calculates a logical product of an inverted value of output data $S_{132}$ from the storage circuit 33 with the sampling-completed flag $S_{011}$, and outputs the calculated result as data $S_{131}$ to the storage circuit 33. The storage circuit 33 is a flip-flop, to which the clock pulse and reset pulse are supplied. The storage circuit 33 captures and stores the output data $S_{131}$ of the AND circuit 31 in sync with the clock pulse, and outputs the operated result as flag data $S_{132}$.

The counter 34 starts counting-up upon receiving a flag value of the flag data $S_{132}$, and outputs a count value $S_{133}$. The counting-up by the counter 11 is halted when a comparison output $S_{135}$ of the comparator 35 is set as a flag, and the count value is returned to the initial value. The comparator 35 compares the count value $S_{133}$ of the counter 34 with the fixed value $S_{134}$, and when $S_{133}$ and $S_{134}$ are equal to each other, sets the flag $S_{135}$. The AND circuit 32 calculates a logical product of the output data $S_{132}$ of the storage circuit 33 with the inverted value of the comparison result $S_{135}$ of the comparator 35, and outputs the calculated result as the sampling-start flag $S_{021}$.

As shown in FIG. 5, the sampled data storage circuit 4 has storage circuits 41[0] to 41[N+M−1] which are flip-flops. The storage circuits 41[0] to 41[N+M−1] are supplied with the clock pulse and reset pulse, and further with the output data $D_{021}$ ($D_{021[0]}$ to $D_{021[N+M−1]}$) from the data addition circuit 2. The storage circuits 41[0] to 41[N+M−1] capture and store the data $D_{021[0]}$ to $D_{021[N+M−1]}$ in sync with the clock pulse, and output the operated results as $D_{031[0]}$ to $D_{031[N+M−1]}$.0 The data $D_{031[0]}$ to $D_{031[N+M−1]}$ is the data $D_{031}$, and the data $D_{031[M]}$ to $D_{031[N+M−1]}$ is an output data $D_{041}$ of the sampled data averaging circuit.

Next, operation of the conventional sampled data averaging circuit having the above configuration is explained. The input data $D_{001}$ to the sampling circuit 1 is assumed to change with time, $D_{00A}$, $D_{00B}$, $D_{00C}$ . . . , as shown in FIG. 6. In addition to the input data $D_{001}$, FIG. 6 also shows time charts of the sampling-completed flag $S_{011}$, sampling-start flag $S_{021}$, and output data $D_{011}$ from the sampling circuit 1. At the rising edge of the change from 0 to 1 of the sampling-start flag $S_{021}$ output from the sampling command circuit 3, the counter 11 begins counting up. When the count value $D_{111}$ of the counter 11 reaches the fixed value, the output $S_{111}$ of the comparator 12 changes from 0 to 1, and in response to the change, the input data $D_{001[0]}$ to $D_{001[N−1]}$ at this time is stored, via the AND circuits 13[0] to 13[N−1], in the FFs 15[0] to 15[N−1]. Thus, the output data $D_{011}$ from the sampling circuit 1 is obtained. Simultaneously with this, the sampling-completed flag $S_{011}$ output from the FF 14 rises from 0 to 1.

FIG. 7 shows, as time charts, the relations between the sampling-completed flag $S_{011}$ input to the data addition circuit 2, the output data $D_{011}$ of the sampling circuit 1 and the output data $D_{031}$ of the sampled data storage circuit 4, and the output data $D_{021}$ of the data addition circuit 2. As shown in FIG. 7, when the sampling-completed flag $S_{011}$ is 0, the output data $D_{031}$ of the sampled data storage circuit 4 is output as output data $D_{021}$. When the sampling-completed flag $S_{011}$ changes to 1, the addition value $D_{121}$ of the output data $D_{011}$ of the sampling circuit 1 at that time and of the output data $D_{031}$ of the sampled data storage circuit 4 becomes the output data $D_{021}$.

FIG. 8 shows, as time charts, the relations between the sampling-completed flag $S_{011}$ input to the sampling command circuit 3, the sampling-start flag $S_{021}$ output from the sampling command circuit 3, and the count value $S_{133}$ of the counter 34 in the sampling command circuit 3. In response to the rising edge of the sampling-completed flag $S_{011}$ from the sampling circuit 1, in the sampling command circuit 3 the output data $S_{131}$ from AND circuit 31 is captured and stored in the storage circuit 33 in sync with the clock pulse, and is output as the flag data $S_{132}$. When the sampling-completed flag $S_{011}$ is 1, the flag data $S_{132}$ indicating 1 is output via the AND circuit 32 as the sampling-start flag $S_{021}$. In response to the rising edge of the flag data $S_{132}$, the counter 34 begins counting up. When the count value $S_{133}$ reaches the fixed value $S_{134}$ ($2^M$), the comparison output $S_{135}$ flag of comparator 35 rises, and in response to the flag $S_{135}$, output as the sampling-start flag $S_{021}$ of the flag data $S_{132}$ by the AND circuit 32 is interrupted, the counting-up of the counter 34 is halted, and the count value $S_{133}$ is returned to the initial value.

FIG. 9 shows as time charts the relations between a clock pulse CK, the data $D_{021}$ supplied to the sampled data storage circuit 4 from the data addition circuit 2, and the output data $D_{031}$ and $D_{041}$ from the sampled data storage circuit 4. At the rising edge of the clock pulse CK, the data $D_{021}$ supplied from the data addition circuit 2 is stored by storage circuits 41[0] to 41[N+M−1], and become output data $D_{031}$. The upper N bits (in FIG. 9, the upper 3 bits) of the output data $D_{031}$ are the averaged output data $D_{041}$.

$2^M$ elements of sampled data are added by the addition circuit 2 and stored in the sampled data storage circuit 4. As a result, the stored data becomes the sum of $2^M$ elements of data. The result of dividing the value by $2^M$ is an average value of the sampled data. Upon dividing by $2^M$, in binary notation, the result is obtained by deleting the lower M bits. The lower M bits become the remainder. Therefore, the values of storage circuits 41[N+M−1] to 41[M] in the sampled data storage circuit 4 become the average data of $2^M$ elements of sampled data, with the lowest M bits discarded.

However, in the conventional sampled data averaging circuit, since the number of samples is fixed, and is not arbitrarily set, it is impossible to sample input data by an optimum number of sampling times in accordance with changes in the input data to average the sampled data.

SUMMARY OF THE INVENTION

It is therefore an object of the present invention to provide a sampled data averaging circuit and method which can perform sampling of input data an arbitrary number of sampling times, and average the sampled data.

A sampled data averaging circuit of this invention is a circuit for sampling input data a plurality of times and calculating an average value of the sampled data, comprising: sampling times setting means for setting a number of sampling times; sampling means for sampling, at predetermined timing, the input data by the number of sampling times set by said sampling times setting means; division means for dividing the sampled data by the number of samplings set by said sampling times setting means, for each time that the data sampling is performed by said sampling means; and accumulation means for sequentially accumulating a division result of said division means, wherein an average value is obtained from accumulation results of said accumulation means.

A sampled data averaging method of this invention is a method for sampling input data a plurality of times and calculating an average value of the sampled data, the method comprising the steps of: setting a number of sampling times; sampling, at predetermined timing, the input data by the number of sampling times set in the setting step; dividing the sampled data by the number of samplings set in the setting step, for each time that the sampling of the input data is performed in the sampling step; sequentially accumulating the division results; and obtaining an average value from the accumulation result.

In a sampled data averaging circuit and method of this invention, for each time the data sampling is performed, the sampled data is divided by the number of sampling times, which is set by the sampling times setting means or step, and the divided result is accumulated to determine an average value, so that the input data can be sampled an arbitrary number of sampling times, and the sampled data can be averaged.

BRIEF DESCRIPTION OF THE DRAWINGS

FIG. 26 shows an example of operation of the data addition circuit of FIG. 22; and, FIG. 27 is a waveform diagram showing an example of operation of the circuit of FIG. 21.

DETAILED DESCRIPTION OF THE INVENTION

Embodiments of the present invention will be described in detail below with reference to the drawings.

Figure 10:
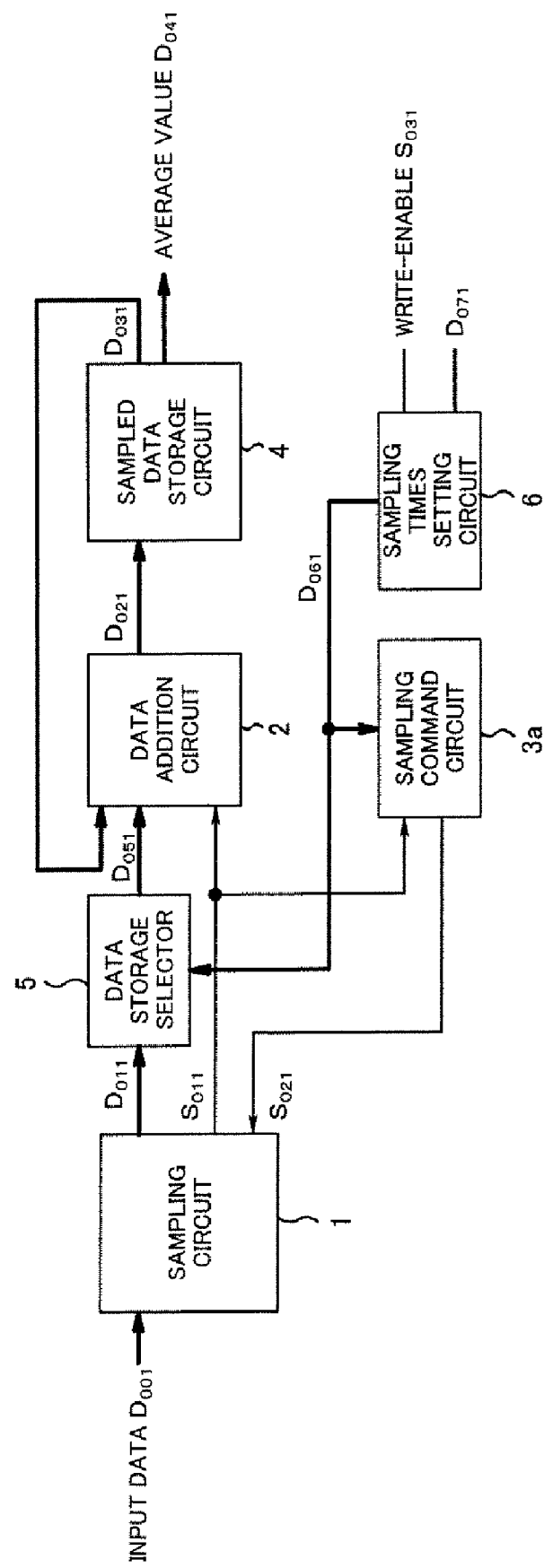
FIG. 10 is a block diagram showing a first embodiment of the invention.

FIG. 10 shows a sampled data averaging circuit of a first embodiment of the invention. The averaging circuit comprises a data storage selector 5 and a sampling times setting circuit 6 in addition to a sampling circuit 1, a data addition circuit 2, a sampling command circuit 3a and a sampled data storage circuit 4.

Figure 11:
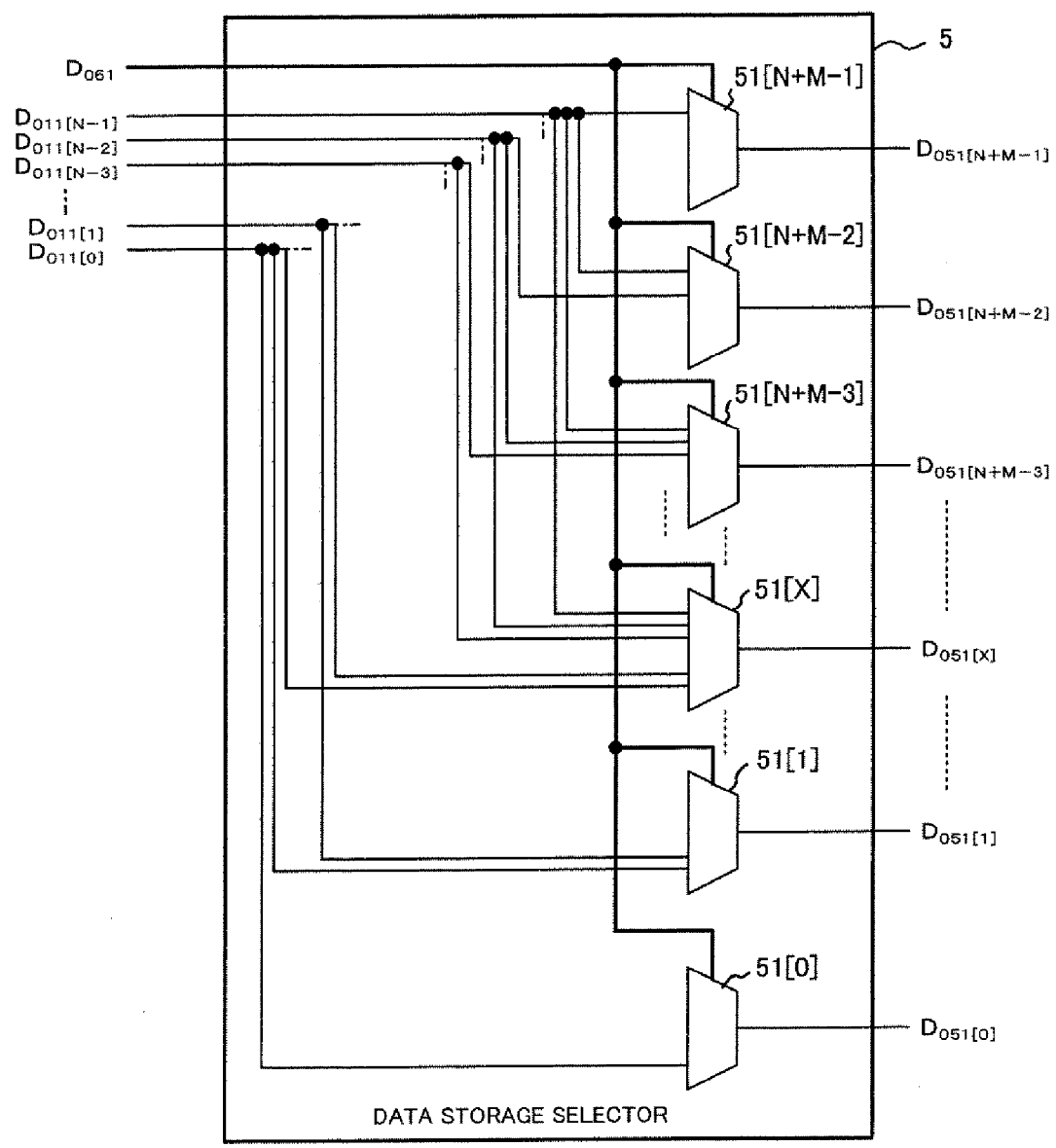
FIG. 11 is a block diagram showing a data storage selector in the circuit of FIG. 10.

As shown in FIG. 11, the data storage selector 5 comprises selector circuits 51[0] to 51[N+M−1], and receives output data $D_{011}$, with a bit width of N bits from the sampling circuit 1 and sampling times data $D_{061}$ output from the sampling times setting circuit 6, and generates output data $D_{051}$, which is supplied to the data addition circuit 2. The output data $D_{051}$ has $D_{051[0]}$ to $D_{051[N+M-1]}$.

Figure 12:
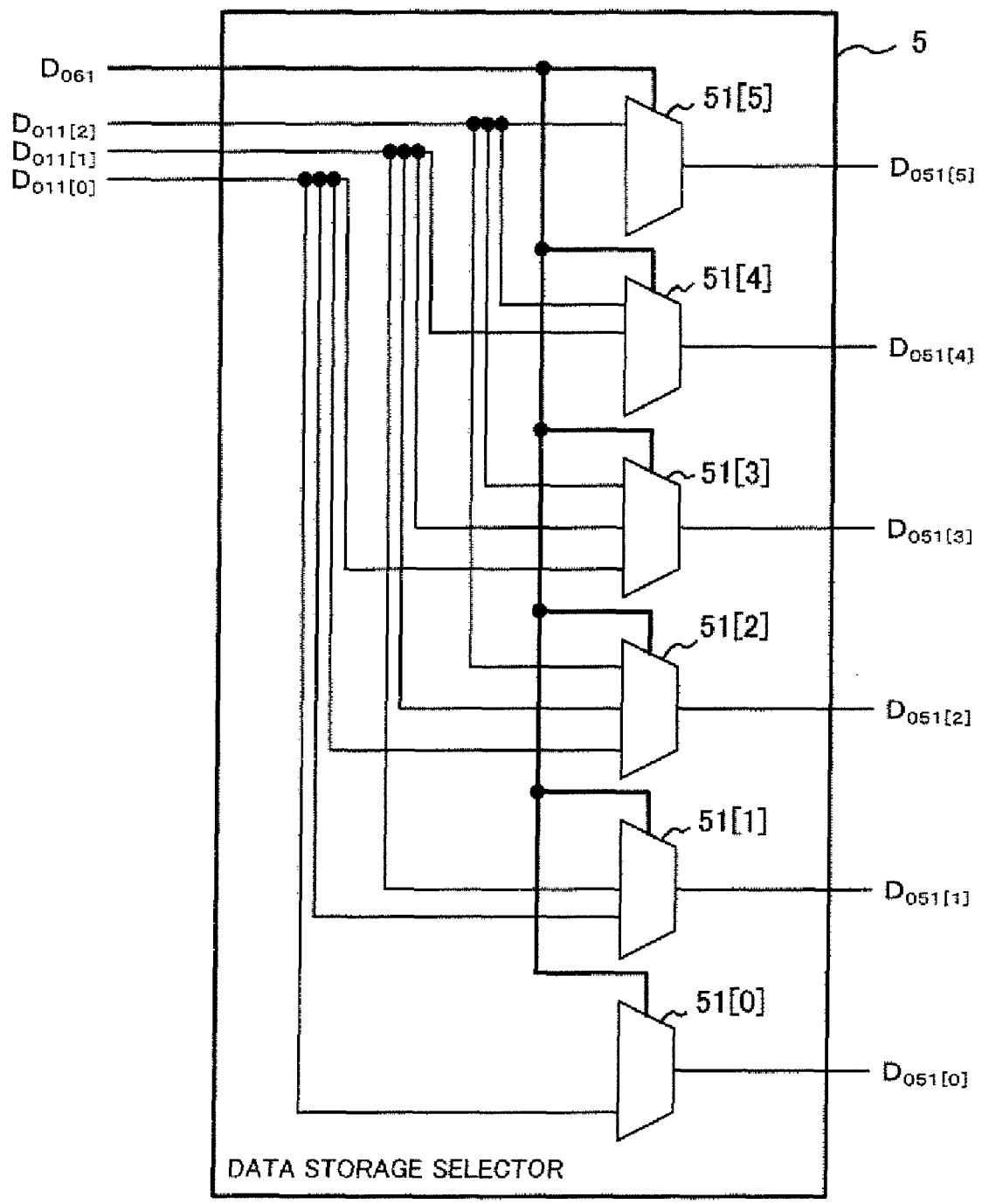
FIG. 12 is a block diagram showing a data storage selector in the circuit of FIG. 10, when N=3 and M=3.

FIG. 12 shows a configuration of the data storage selector 5 when N=3 and M=3. That is, selector circuits 51[0] to 51[5] are provided, and data $D_{051}$ ($D_{051[0]}$ to $D_{051[5]}$) with a bit width of 6 bits, is output.

Figures 13, 14:
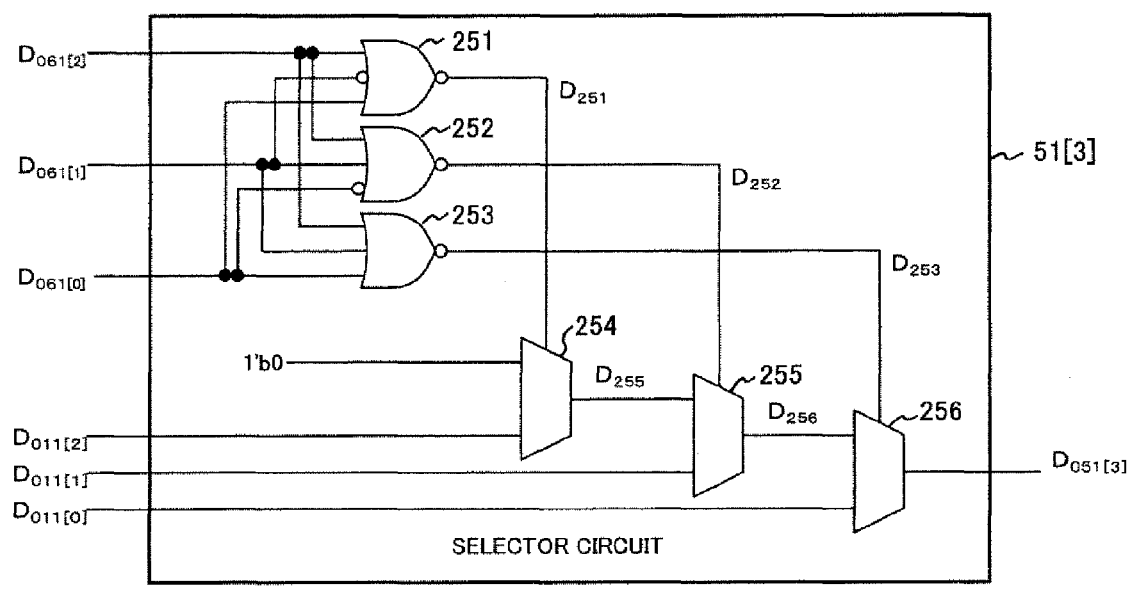
FIG. 13 is a block diagram showing one selector circuit in the data storage selector of FIG. 12.
FIG. 14 shows an example of operation of the data storage selector of FIG. 11.

Of the selector circuits 51[0] to 51[5] in FIG. 12, the selector circuit 51[3] includes, as shown in FIG. 13, three-input NOR circuits 251 to 253 and selectors 254 to 256. The three-input NOR circuit 251 inputs the inverted value of sampling times data $D_{061[1]}$, and sampling times data $D_{061[2]}$ and $D_{061[0]}$, and outputs signal $D_{251}$, and the output $D_{251}$ is equal to 1 only when $D_{061}[2:0]=3'b010$. The three-input NOR circuit 252 inputs the inverted value of the sampling times data $D_{061[0]}$, and the sampling times data $D_{061[1]}$ and $D_{061[2]}$, and the outputs signal $D_{252}$ is equal to 1 only when $D_{061}[2:0]=3'b001$. The three-input NOR circuit 253 inputs the sampling times data $D_{061[0]}$, and sampling times data $D_{061[1]}$ and $D_{061[2]}$, and the output signal $D_{253}$ is equal to 1 only when $D_{061}[2:0]=3'b000$.

The above notation $D_{061}[2:0]$ indicates the three bits of data $D_{061}$, which are $D_{061[2]}$ to $D_{061[0]}$. In the above notation "3'b010", "3'b" indicates three bits of data, and the three bits are, in order from the highest to the lowest bits, "010".

The selector 254 uses the output signal $D_{251}$ of the three-input NOR circuit 251 as a selector signal, to select one of the inputs 1'b0 and $D_{011[2]}$, in accordance with the selector signal $D_{251}$, for output as a signal $D_{255}$. The selector 255 uses the output signal $D_{252}$ of the three-input NOR circuit 252 as a selector signal, to select one of the inputs $D_{255}$ and $D_{011[1]}$ in accordance with the selector signal $D_{252}$, for output as a signal $D_{256}$. The selector 256 uses the output signal $D_{253}$ of the three-input NOR circuit 253 as a selector signal, to select one of the inputs $D_{256}$ and $D_{011[0]}$ in accordance with the selector signal $D_{253}$, for output as a signal $D_{051[3]}$.

When $D_{061}[2:0]=3'b000$, $D_{253}$ is 1, and so the output data $D_{011[0]}$ of the sampling circuit 1 is output as $D_{051[3]}$. When $D_{061}[2:0]=3'b001$, $D_{252}$ is 1, and so the output data $D_{011[1]}$ of the sampling circuit 1 is output as $D_{051[3]}$. When $D_{061}[2:0]=3'b010$, $D_{251}$ is 1, and so the output data $D_{011[2]}$ of the sampling circuit 1 is output as $D_{051[3]}$. When $D_{061}[2:0]$ is other than the above values, the select signals sent to the selectors 254 to 256 are all 0, and so 1'b0 is output as $D_{051[3]}$.

In the selector circuit 51[3], with the sampling times data $D_{061}$ as the selector signal, the input value $D_{011}$ output as the signal $D_{051[3]}$ is bit-shifted in the lower bit direction by the value of the sampling times data $D_{061}$.

The data storage selectors 5 shown in FIG. 11, all select the data for output in accordance with the value of the sampling times data $D_{061}$. Thus, if the value of the sampling times data $D_{061}$ indicates $2^I$ times ($I \leq M$), then $D_{011}$, of width N bits, is shifted only by I bit (bits) from higher bits to lower bits by the data storage selector 5 and allocated to data $D_{051}$. In the data $D_{051}$, the bits other than the allocated bits of $D_{011}$ are 0.

FIG. 14 is a time chart showing operation of the data storage selector 5 when, with N=3 and M=4, the data $D_{011}$ is fixed. When the sampling times data $D_{061}$ changes with the I of $2^I$, which is changed with time in the order 1, 3, 2, the bit of $D_{051}$ to which the data $D_{011}$ is allocated changes in accordance with the value I of $D_{061}$.

Figure 15:
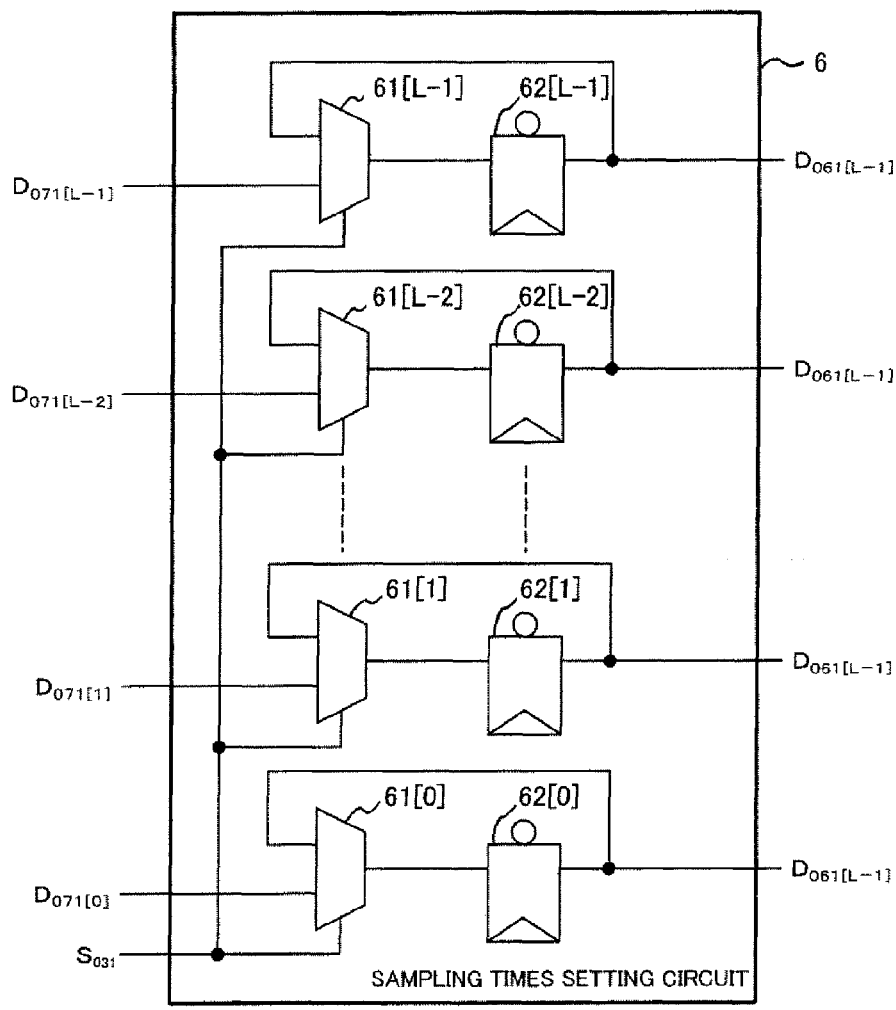
FIG. 15 is a block diagram showing a sampling times setting circuit in the circuit of FIG. 10.

Next, as shown in FIG. 15, the sampling times setting circuit 6 includes selectors 61[0] to 61[L−1] and storage circuits 62[0] to 62[L−1] which are flip-flops. In the sampling times setting circuit 6, L bits of data $D_{071[0]}$ to $D_{071[L-1]}$ and a write-enable data $S_{031}$ are supplied as inputs, and L bits of sampling times data $D_{061[1]}$ to $D_{061[L-1]}$ are generated as outputs. Each of the storage circuits 62[0] to 62[L−1] stores data supplied from selectors 61[0] to 61[L−1] in sync with a clock pulse, and outputs the stored data.

For example, when the write-enable bit $S_{031}$ is 1, arbitrary data $D_{071[0]}$ to $D_{071[L-1]}$ input from an operation portion (not shown) is supplied to the storage circuits 62[0] to 62[L−1] via the selectors 61[0] to 61[L−1], and the supplied data is stored and output, as sampling times data $D_{061[1]}$ to $D_{061[L-1]}$, by the storage circuits 62[0] to 62[L−1]. When the write-enable bit $S_{031}$ is 0, the sampling times data $D_{061[1]}$ to $D_{061[L-1]}$ at this time is supplied to the storage circuits 62[0] to 62[L−1] via the selectors 61[0] to 61[L−1], and the supplied data is stored and output, as sampling times data $D_{061[1]}$ to $D_{061[L-1]}$ by the storage circuits 62[0] to 62[L−1]. The sampling times data $D_{061[1]}$ to $D_{061[L-1]}$ indicate a power value of 2.

Figure 4:
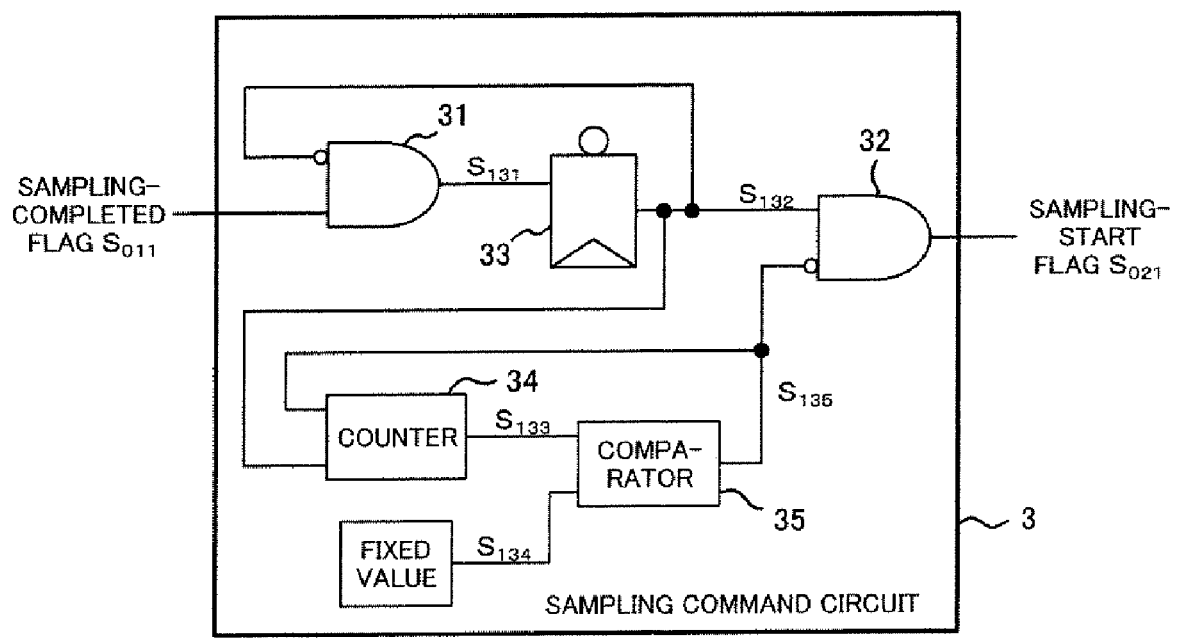
FIG. 4 is a block diagram showing a sampling command circuit in the circuit of FIG. 1.
Figure 5:
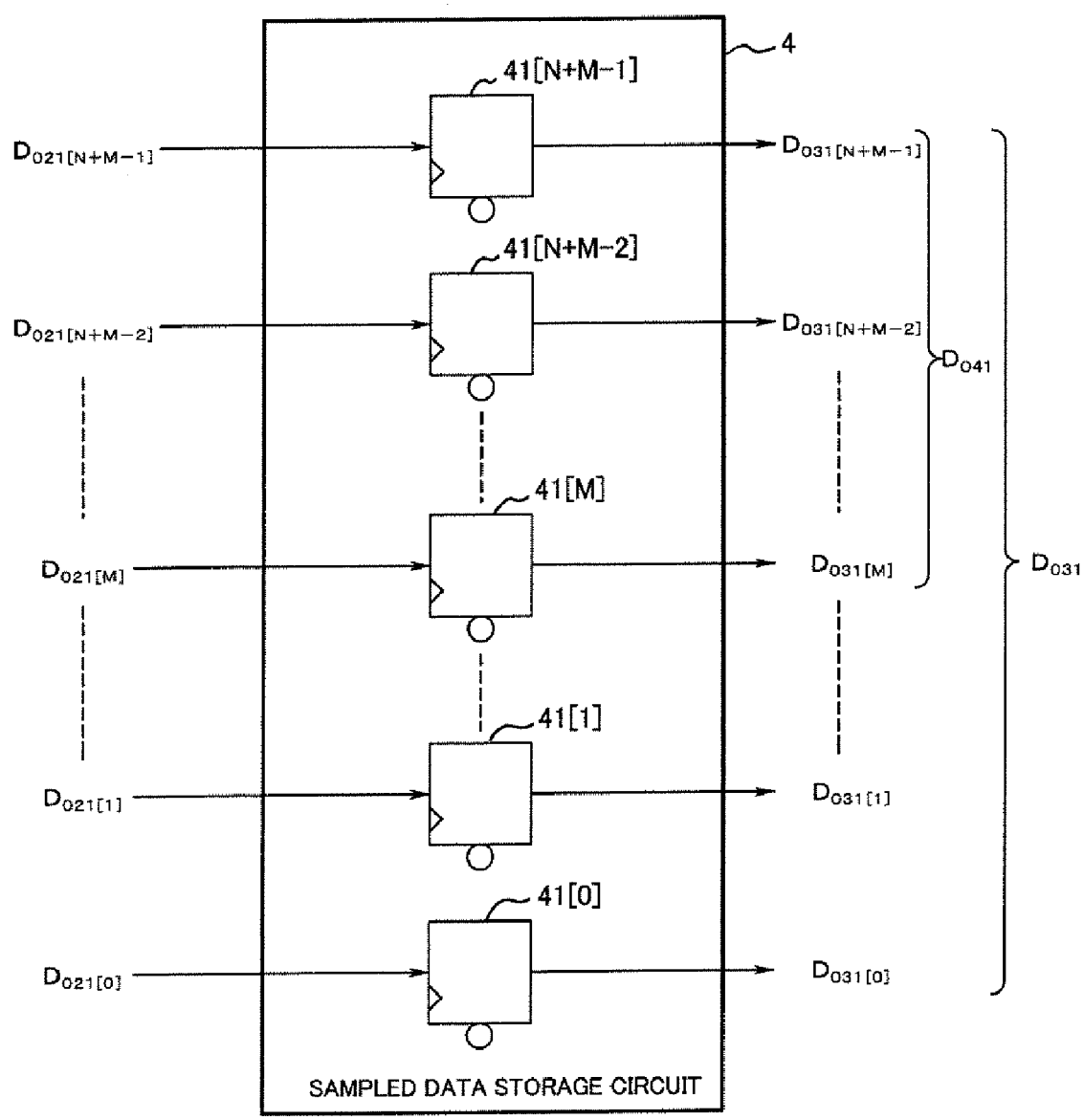
FIG. 5 is a block diagram showing a sampled data storage circuit in the circuit of FIG. 1.
Figure 6:
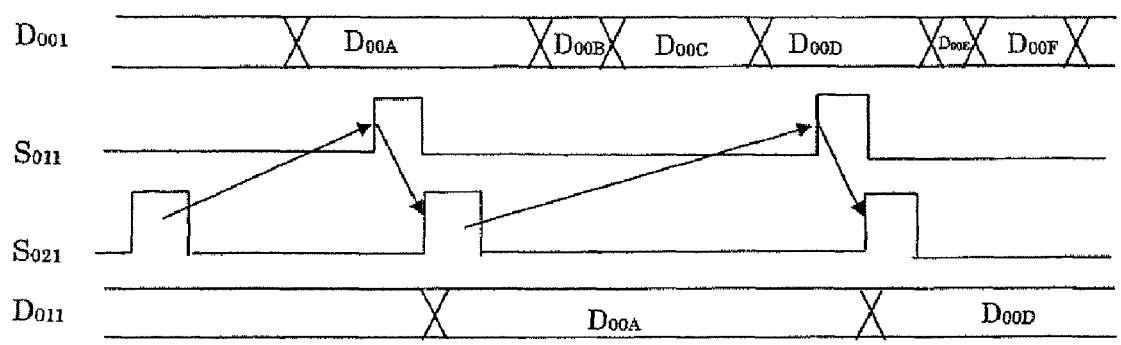
FIG. 6 shows an example of operation of the sampling circuit of FIG. 2.
Figure 7:
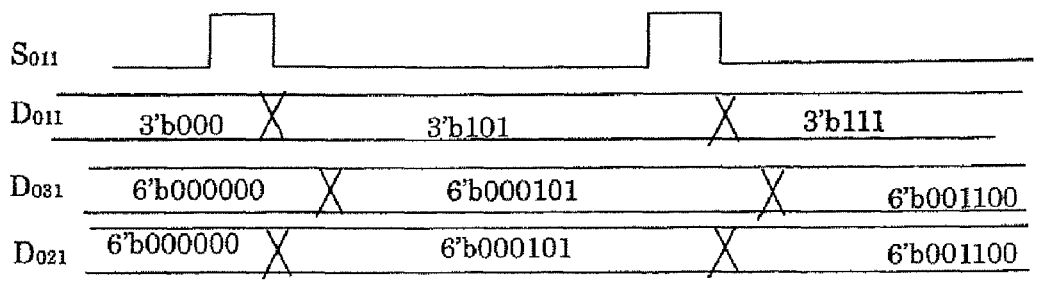
FIG. 7 shows an example of operation of the data addition circuit of FIG. 3.
Figure 8:
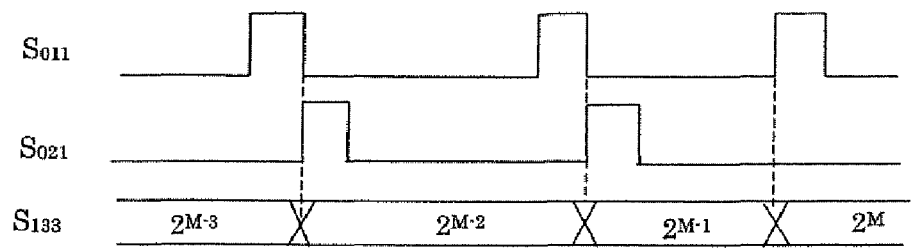
FIG. 8 shows an example of operation of the sampling command circuit of FIG. 4.
Figure 9:
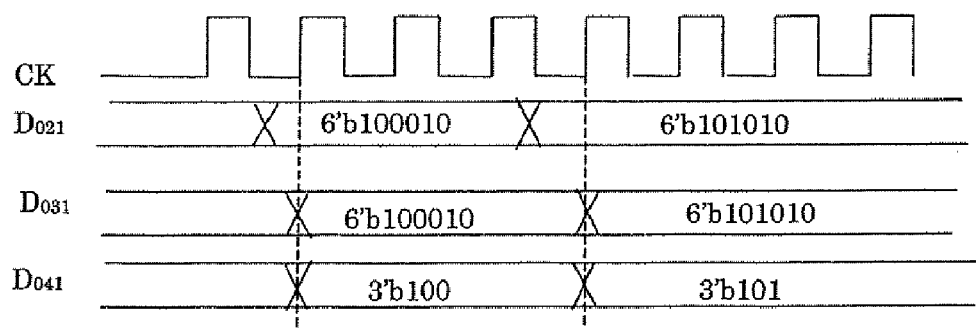
FIG. 9 shows an example of operation of the sampled data storage circuit of FIG. 5.
Figure 16:
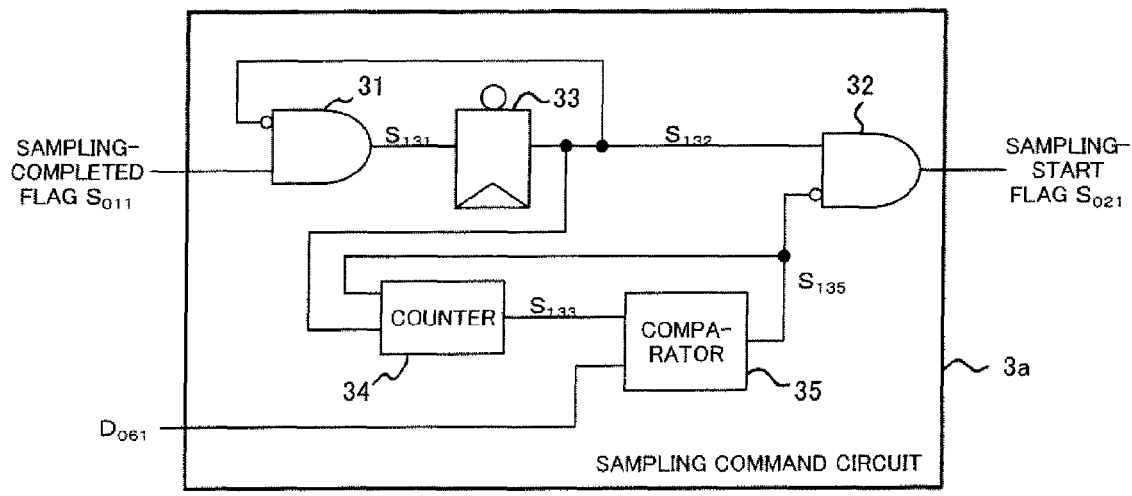
FIG. 16 is a block diagram showing a sampling command circuit in the circuit of FIG. 10.

In the sampling command circuit 3 shown in FIG. 4, the fixed value is supplied to the comparator 35. However, as shown in FIG. 16, in the sampling command circuit 3a of this embodiment, the sampling times data $D_{061}$ output from the sampling times setting circuit 6 is supplied to the comparator 35. Otherwise the configuration is the same as that of the circuit 3 shown in FIG. 4.

In the sampling command circuit 3a, the comparator 35 compares the count value $S_{133}$ of the counter 34 with the sampling times data $D_{061}$, and when $S_{133}$ and $D_{061}$ are equal to each other, sets the flag $S_{135}$. The AND circuit 32 calculates the logical product of the output data $S_{132}$ of the storage circuit 33 and the inverted value of the comparison result $S_{135}$ of the comparator 35, and outputs the calculated result as the sampling-start flag $S_{021}$.

Figure 1:
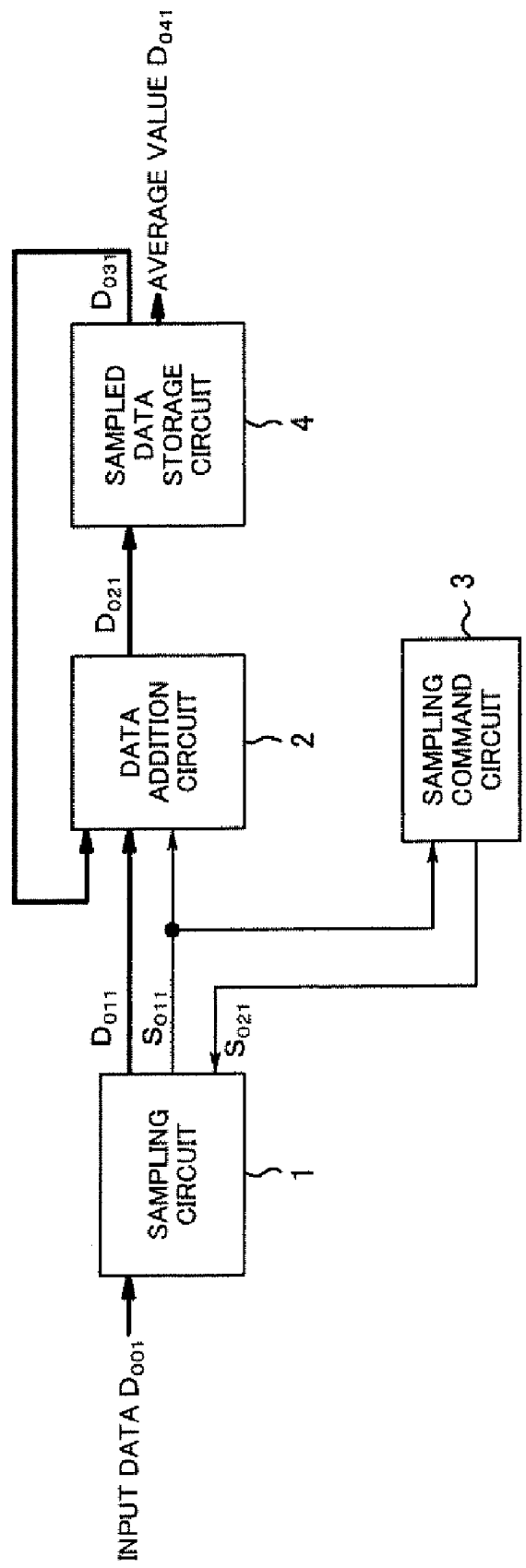
FIG. 1 is a block diagram showing a conventional sampled data averaging circuit.
Figure 2:
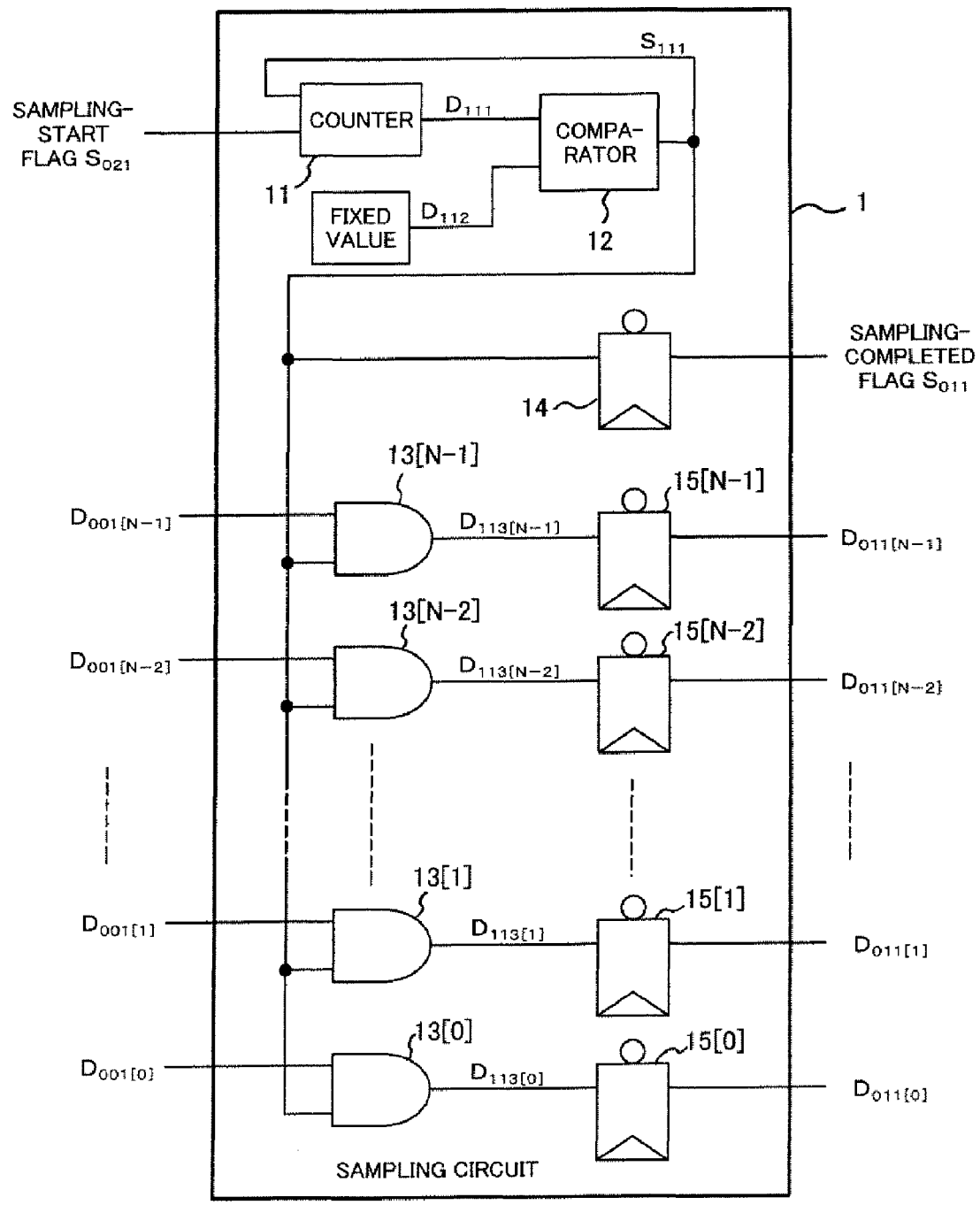
FIG. 2 is a block diagram showing a sampling circuit in the circuit of FIG. 1.

Other portions of the averaging circuit of FIG. 10, such as the sampling circuit 1, data addition circuit 2, and sampled data storage circuit 4, are the same as in FIG. 1. It should be noted that the data storage selector 5 is division means, and the data addition circuit 2 and sampled data storage circuit 4 corresponds to accumulation means.

In the sampled data averaging circuit according to the invention with the above configuration, the number of sampling times $2^I$ is set by the sampling times setting circuit 6. This is supplied, as sampling times data $D_{061}$, to the sampling command circuit 3a. The sampling command circuit 3a outputs a sampling command of $2^I$ times to the sampling circuit 1, in accordance with the input data $D_{061}$.

The data $D_{011}$ which is the sampling result of the sampling circuit 1 is supplied to the data addition circuit 2 as $D_{051}$ via the data storage selector 5, and there is added with data $D_{031}$. The addition result data $D_{021}$ is supplied to the sampled data storage circuit 4, where it is stored. The stored output data $D_{031}$ is obtained, and this is used for addition to the next $D_{051}$ in the data addition circuit 2.

Upon acquiring data for the $2^I$ samplings, the value of $D_{041}$ of the sampled data storage circuit 4, that is, the upper bits [N+M−1:M] of $D_{031}$, are used to obtain the average value of the $2^I$ samples. Here, the notation of the upper bits [N+M−1: M] of $D_{031}$ indicates the values $D_{031[M]}$ to $D_{031[N+M-1]}$ This notation method is similarly used below for other data.

Figure 17:
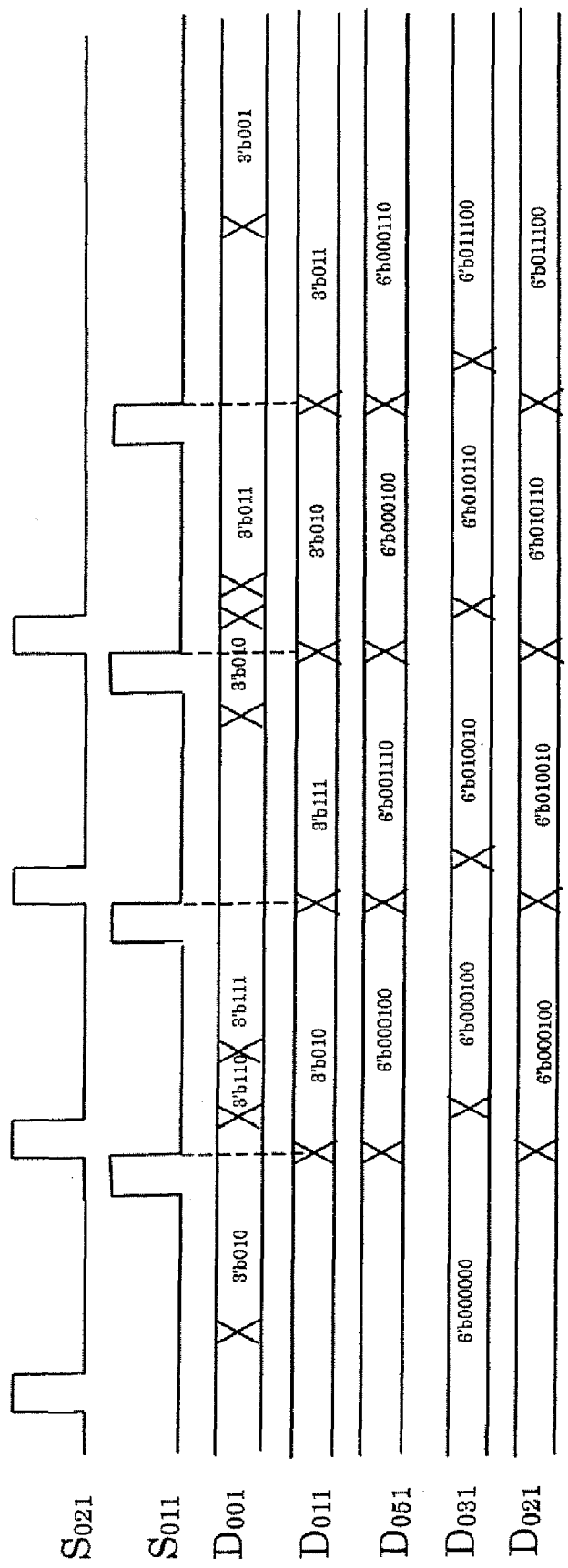
FIG. 17 shows an example of operation of the circuit of FIG. 10.

FIG. 17 shows a time chart, when N=3, M=3, and I=2, of the sampling-start flag $S_{021}$, sampling-completed flag $S_{011}$, input data $D_{001}$, output data $D_{011}$ of sampling circuit 1, output data $D_{051}$ of data storage selector 5, output data $D_{031}$ of sampled data storage circuit 4, and output data $D_{021}$ of addition circuit 2. The input data $D_{001}$ changes randomly. After the sampling-start flag $S_{021}$ changes to 1, when sampling is completed, the sampling-completed flag $S_{011}$ changes to 1. At this time, the output data $D_{011}$ is the result of sampling by the sampling circuit 1 of the values of the input data $D_{001}$.

As described above, because N=3, M=3, and I=2, the 3-bit-width $D_{011}$ is allocated to [3:1] of the output data $D_{051}$ of the data storage selector 5. The other bits are made 0. The value of the output data $D_{051}$ of the data storage selector 5 indicates the value obtained by shifting by I, that is, the value $D_{011}$ divided by the number of sampling times $2^I$. In the addition circuit 2, the value of this output data $D_{051}$ is added to the output data $D_{031}$ of the sampled data storage circuit 4, which is an accumulated value, to become the output data $D_{021}$. The data $D_{051}$ which is the first sampling result is 6'b000100, the initial value of the output data $D_{031}$ of the sampled data storage circuit 4 is 6'b000000, and the addition result output data $D_{021}$ is 6'b000100. The output data $D_{021}$ is stored in the sampled data storage circuit 4, and becomes the output data $D_{031}$. In the addition circuit 2, the output data $D_{031}$ is used in addition with the value 6'b001110 of the data $D_{051}$ which is the second sampling result.

In this way, after completion of sampling $2^I$=4 times, as the output data $D_{021}$ of the addition circuit 2, 6'b011100 is output as the accumulation result. The upper 3 bits [5:3] of the output data $D_{021}$ is the average value, and so the average value of the four samplings is 3'b011.

Thus, in the averaging circuit of the first embodiment, an arbitrary number of sampling times $2^I$ is input using the sampling times setting circuit 6, and optimum averaging processing of input data is performed in accordance with the number of samplings, so that the average value can be properly obtained.

Figure 18:
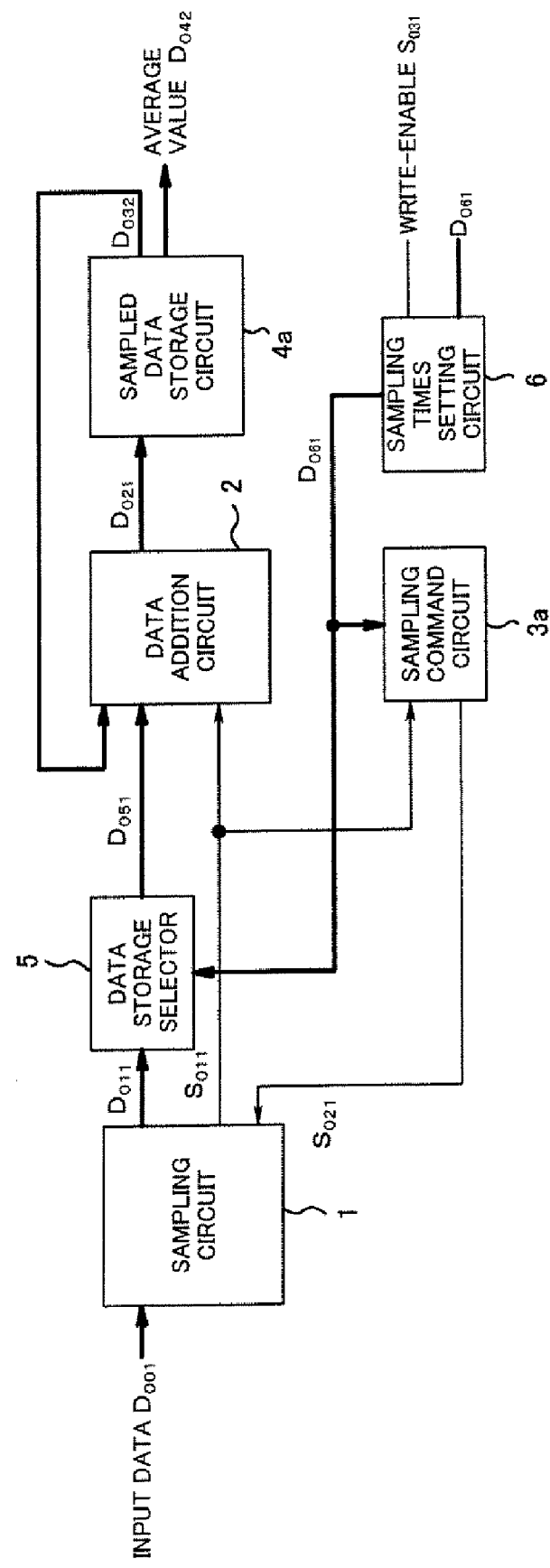
FIG. 18 is a block diagram showing a second embodiment of the invention.

FIG. 18 shows a sampled data averaging circuit of a second embodiment of the invention. This averaging circuit comprises a sampling circuit 1, a data addition circuit 2, a sampling command circuit 3a, a sampled data storage circuit 4a, a data storage selector 5, and a sampling times setting circuit 6.

Figure 19:
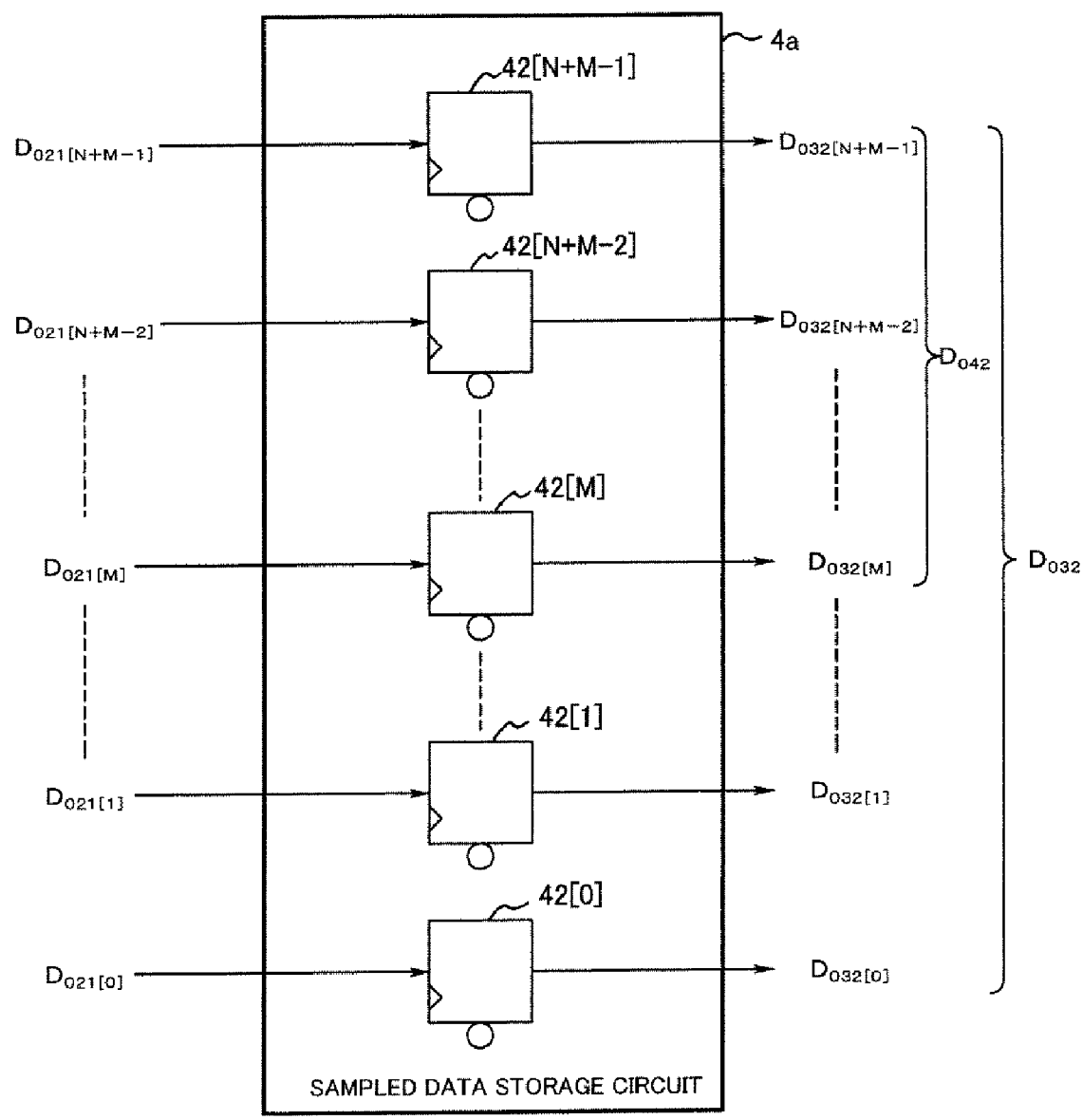
FIG. 19 is a block diagram showing a sampled data storage circuit in the circuit of FIG. 18.

As shown in FIG. 19, the sampled data storage circuit 4a comprises storage circuits 42[0] to 42[N+M−1], which are flip-flops, and to which a clock pulse and a reset pulse are supplied. Output data $D_{021}$ ($D_{021[0]}$ to $D_{021[N+M-1]}$) of the data addition circuit 2 is also supplied to the storage circuits 42[0] to 42[N+M−1]. The storage circuits 42[0] to 42[N+M−1] capture and store data $D_{021[0]}$ to $D_{021[N+M-1]}$ in sync with the clock pulse, for output as $D_{032[0]}$ to $D_{032[N+M-1]}$. $D_{032[0]}$ to $D_{032[N+M-1]}$ are data $D_{032}$, and $D_{031[M]}$ to $D_{031[N+M-1]}$ are output data $D_{042}$ of the sampled data averaging circuit.

As a result of supply of the reset pulse, the initial value of the storage circuit 42[M−1] each time an average value is calculated is 1, whereas the initial value for all the other storage circuits 42[0] to 42[M−2] and 42[M] to 42[N+M−1] is 0. This adds 1 to the highest bit $D_{032[M-1]}$ of the remainder bits $D_{032[0]}$ to $D_{032[M-1]}$, and enables rounding-off of the remainder bits $D_{032[0]}$ to $D_{032[M-1]}$ for the average value $D_{042}$.

The remainder bits [M−1:0] can take on values from 000 . . . 000 to 111 . . . 111, and the central value of the lower bits is 100 . . . 000. When 1 is added to the most significant bit of remainder data at not less than 100 . . . 000, carryover to the next-higher bit occurs, whereas when 1 is added to the most significant bit of data less than 100 . . . 000 (that is, 011 . . . 0.111 or lower), the most significant bit remains 1, and carryover to the higher-bit data does not occur. That is, by making 1 the initial value of the storage circuit 42[M−1], rounding-off is possible.

Figure 20:
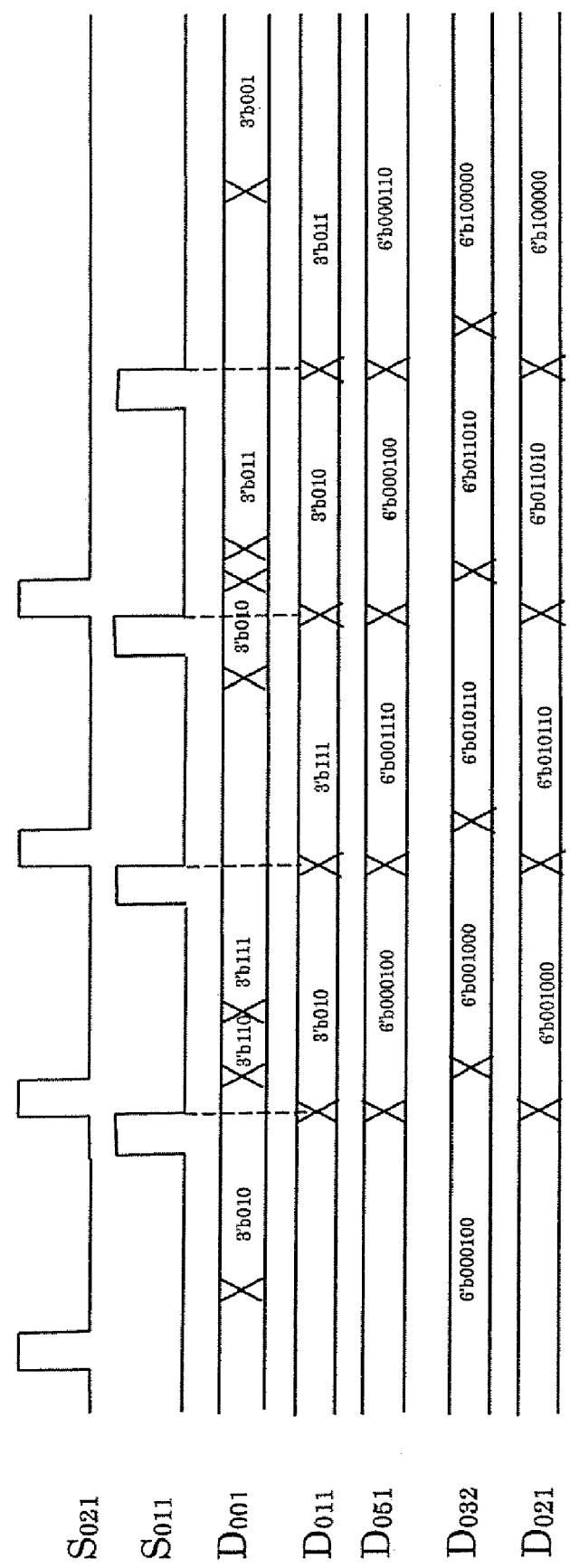
FIG. 20 shows an example of operation of the circuit of FIG. 18.

FIG. 20 shows a time chart, when the data bit width N=3, M=3, and I=2 in the second embodiment, of the sampling-start flag $S_{021}$, sampling-completed flag $S_{011}$, input data $D_{001}$, output data $D_{011}$ of the sampling circuit 1, output data $D_{051}$ of the data storage selector 5, output data $D_{031}$ of the sampled data storage circuit 4, and output data $D_{021}$ of the addition circuit 2. Each of the values of $S_{021}$, $S_{011}$, $D_{001}$, $D_{011}$, and $D_{051}$ is the same as the values shown in FIG. 17 as an example of operation in the first embodiment.

In FIG. 20, the 3-bit width data $D_{011}$ output from the sampling circuit 1 is allocated to [N+M−I−1:M−I]=[3:1] of data $D_{051}$ in the data storage selector 5. Data $D_{051}$ is added to the output data $D_{032}$ of the sampled data storage circuit 4a by the addition circuit 2. The data $D_{051}$ which is the first sampling result is 6'b000100, and the initial value of the output data $D_{032}$ of the sampled data storage circuit 4a is 6'b000100. Hence the added data $D_{021}$ is 6'b001000. This addition result data $D_{021}$ is stored in storage circuits 42[0] to 42[5] of the sampled data storage circuit 4a. The output data $D_{032}$ of storage circuits 42[0] to 42[5] is used for addition in addition circuit 2 to the value 6'b001110 of data $D_{051}$ which is the second sampling result. This is performed for the value 6'b000100 for data $D_{051}$ for the third sampling result, and for the value 6'b000110 for data $D_{051}$ for the fourth sampling result. The addition value 6'b100000 of these four samplings is set in the six bits 42[5] to 42[0] of the storage circuit 42, and the value of the upper 3 bits, 3'b100, is the average value $D_{042}$.

When compared with the case shown in FIG. 17 as an example of operation of the first embodiment described above, in the first embodiment the average value with remainder data discarded is 3'b011, but in the second embodiment, remainder data rounding-off is performed, and so the average value is 3'b100.

Thus, in the averaging circuit of the second embodiment, an arbitrary number of sampling times $2^I$ is input at the sampling times setting circuit 6, and optimum averaging processing according to the number of sampling times is performed for the input data, so that the average value can be properly obtained. Moreover, rounding-off of the remainder data is performed, so that the average value with high precision can be output.

Figure 21:
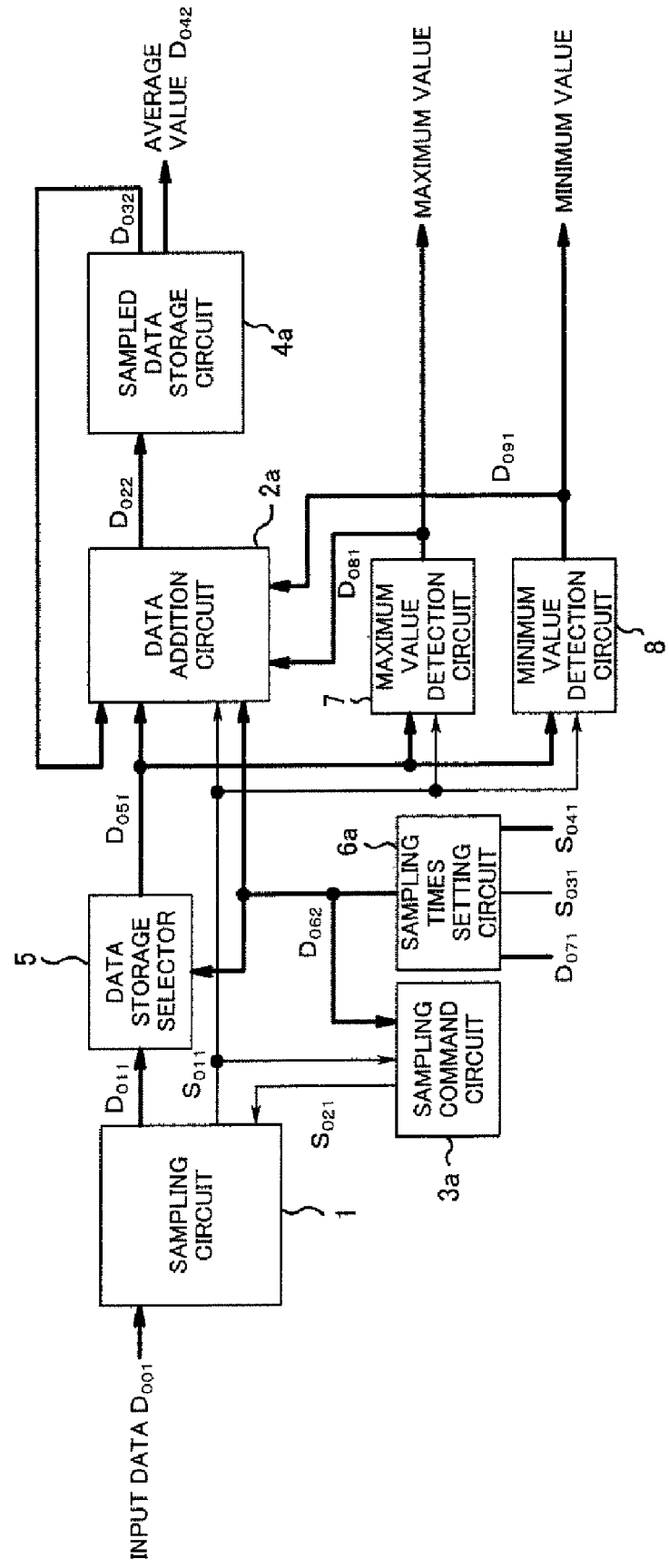
FIG. 21 is a block diagram showing a third embodiment of the invention.

FIG. 21 shows a sampled data averaging circuit of a third embodiment of the invention. This averaging circuit comprises a sampling circuit 1, a data addition circuit 2a, a sampling command circuit 3a, a sampled data storage circuit 4a, a data storage selector 5, a sampling times setting circuit 6a, a maximum value detection circuit 7, and a minimum value detection circuit 8.

Figure 3:
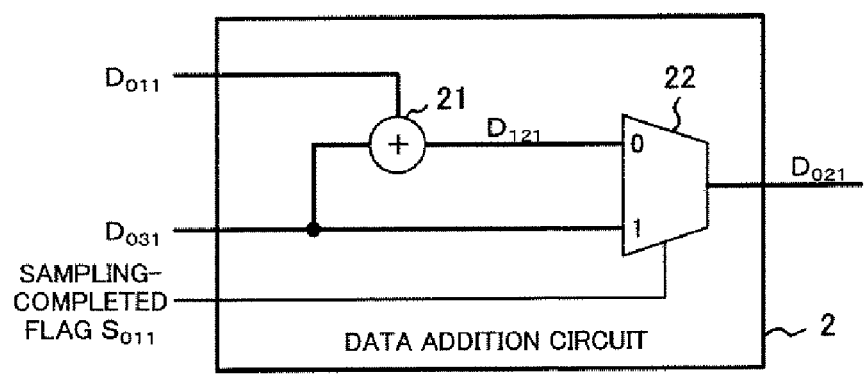
FIG. 3 is a block diagram showing a data addition circuit in the circuit of FIG. 1.
Figure 22:
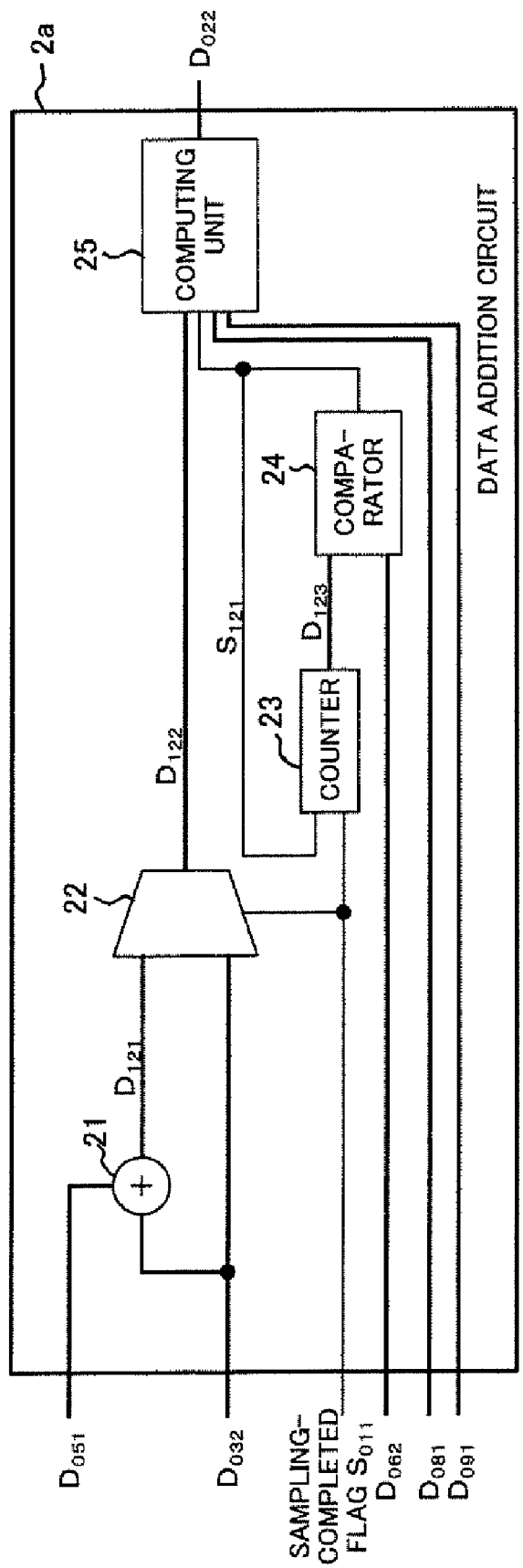
FIG. 22 is a block diagram showing a data addition circuit in the circuit of FIG. 21.

As shown in FIG. 22, the data addition circuit 2a comprises, in addition to an adder 21 and a selector 22, a counter 23, a comparator 24, and a computing unit 25. The portion including the adder 21 and selector 22 is the same as the data addition circuit 2 shown in FIG. 3. Output data $D_{122}$ of the selector 22 is supplied to the computing unit 25. The counter 23 performs counting-up each time a sampling-completed flag $S_{011}$ changes from 0 to 1. The count value $D_{123}$ of the counter 23 is supplied to the comparator 24. When the count value $D_{123}$ of the counter 23 becomes equal to sampling times data $D_{062}=2^I+2$ supplied from the sampling times setting circuit 6a, the comparator 24 causes an output coincidence flag $S_{121}$ to change from 0 to 1. The coincidence flag $S_{121}$ is supplied to the counter 23 and the computing unit 25. When the coincidence flag $S_{121}$, becomes 1, the counter 23 reset the count value $D_{123}$ to 0. When the coincidence flag $S_{121}$, becomes 1, the computing unit 25 subtracts data $D_{081}$ and $D_{091}$ from the output data $D_{122}$ of the selector 22, and outputs the result data $D_{022}$ to the sampled data storage circuit 4a. The data $D_{081}$ is supplied from the maximum value detection circuit 7, and the data $D_{091}$ is supplied from the minimum value detection circuit 8.

Figure 23:
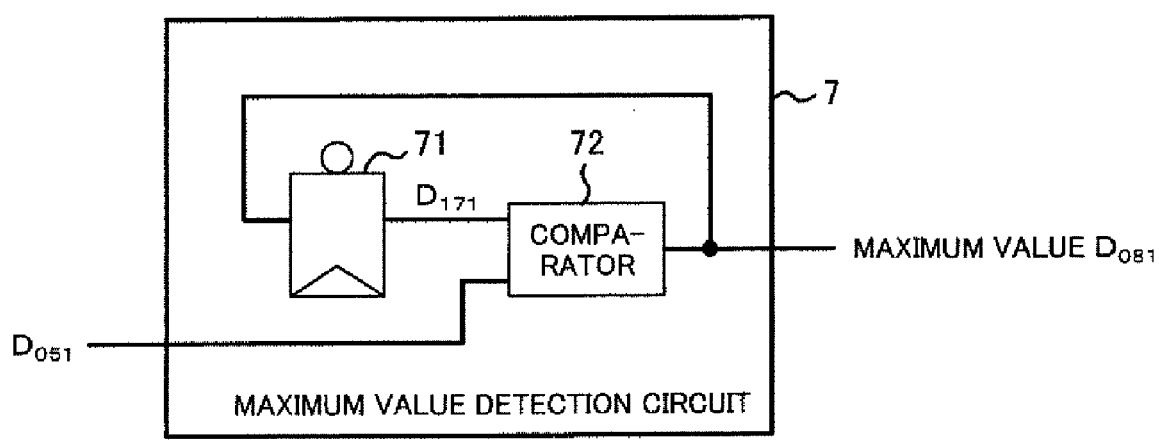
FIG. 23 is a block diagram showing a maximum value detection circuit in the circuit of FIG. 21.

As shown in FIG. 23, the maximum value detection circuit 7 has a storage circuit 71 which is a flip-flop, and a comparator 72. The storage circuit 71 stores, as a maximum value, output data $D_{081}$ of the comparator 72 in sync with the clock pulse, and outputs the maximum value as $D_{171}$ to the comparator 72. The comparator 72 compares the maximum value $D_{171}$, stored in the storage circuit 71 with the output data $D_{051}$ of the data storage selector 5. If the output data $D_{051}$ exceeds the stored maximum value $D_{171}$, the output data $D_{051}$ is output as the output data $D_{081}$ of the comparator 72, and thereafter, the stored data $D_{171}$ of the storage circuit 71 is updated in sync with the clock pulse.

Figure 24:
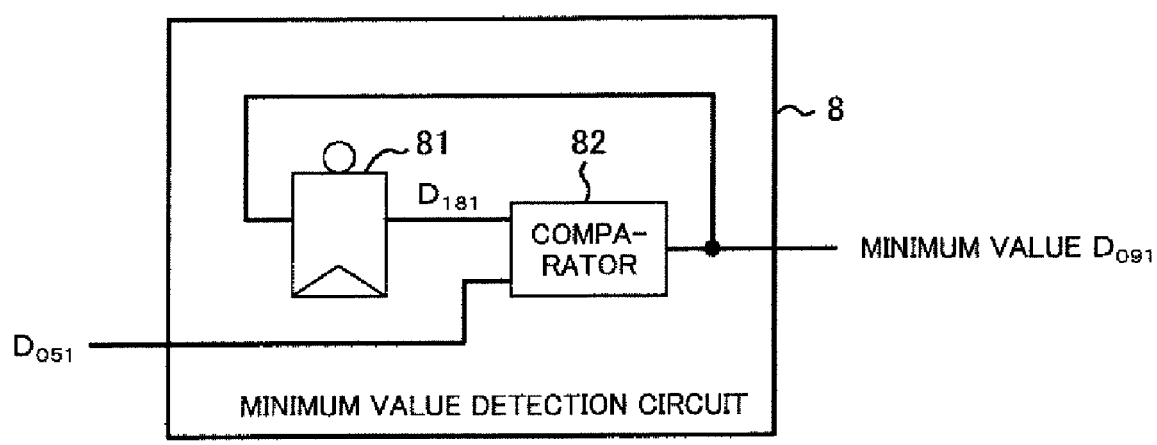
FIG. 24 is a block diagram showing a minimum value detection circuit in the circuit of FIG. 21.

As shown in FIG. 24, the minimum value detection circuit 8 has a storage circuit 81 which is a flip-flop, and a comparator 82. The storage circuit 81 stores, as a minimum value, output data $D_{091}$ of the comparator 82 in sync with the clock pulse, and outputs the minimum value as $D_{181}$ to the comparator 82. The comparator 82 compares the minimum value $D_{181}$ stored in the storage circuit 81 and the output data $D_{051}$ of the data storage selector 5. If the output data $D_{051}$ is less than the stored minimum value $D_{181}$, the output data $D_{051}$ is output as the output data $D_{091}$ of the comparator 82, and thereafter, the stored data $D_{181}$ of the storage circuit 81 is updated in sync with the clock pulse.

Figure 25:
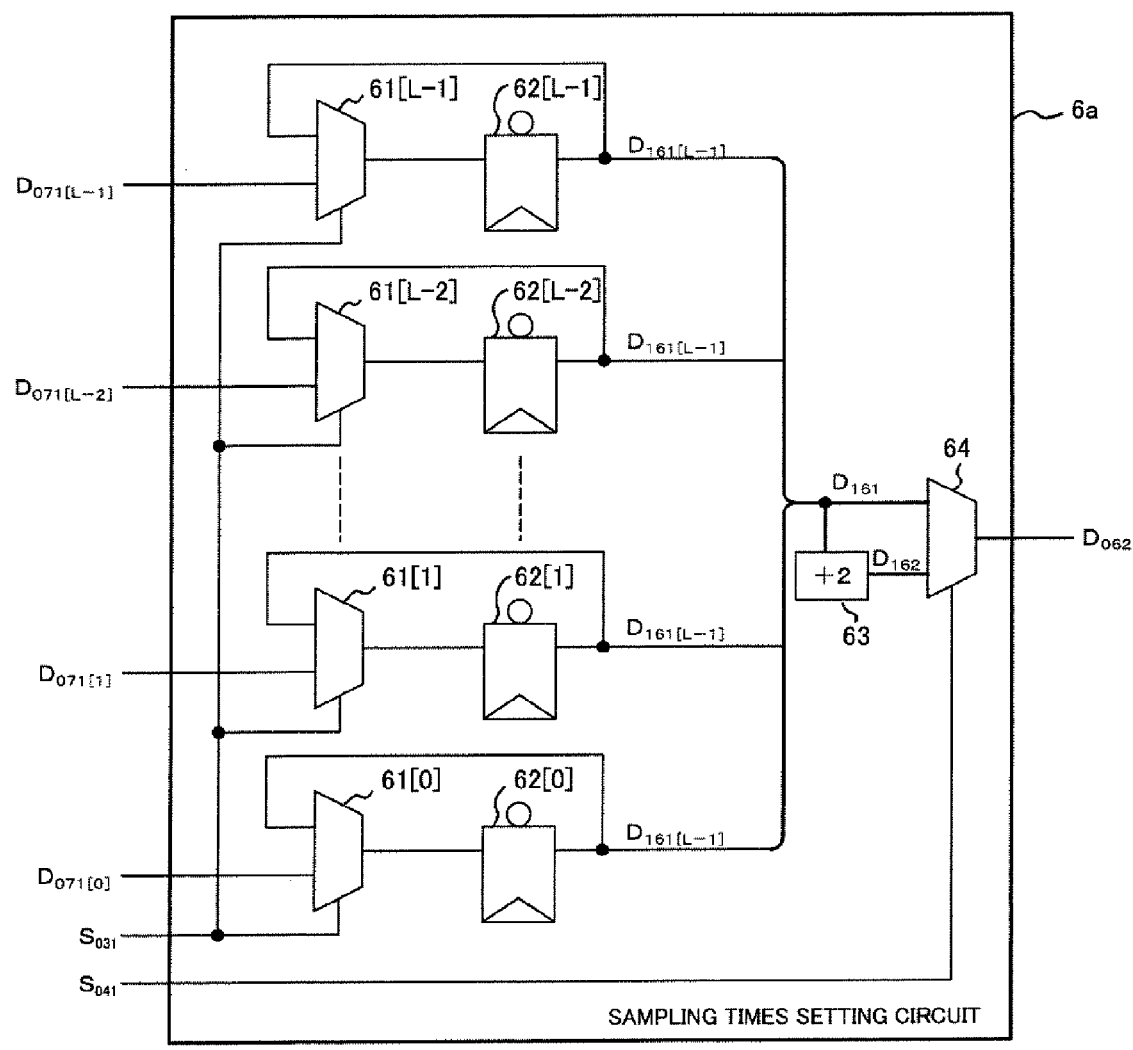
FIG. 25 is a block diagram showing a sampling times setting circuit in the circuit of FIG. 21.

As shown in FIG. 25, the sampling times setting circuit 6a has selectors 61[0] to 61[L−1] and storage circuits 62[0] to 62[L−1], similarly to the sampling times setting circuit 6 shown in the first and second embodiments, and in addition has an addition circuit 63 and a selector circuit 64. The addition circuit 63 adds 2 to data $D_{161}$ output from the storage circuits 62[0] to 62[L−1], and outputs the result as $D_{162}$. The selector circuit 64 outputs, as sampling times data $D_{062}$, one of the data $D_{161}$ output from the storage circuits 62[0] to 62[L−1], and the output data $D_{162}$ of the addition circuit 63, in accordance with an input flag $S_{041}$. When the input flag $S_{041}$ is 1, the data $D_{162}$ becomes the sampling times data $D_{062}$. When the input flag $S_{041}$ is 0, the data $D_{161}$, becomes the sampling times data $D_{062}$, and in this case the operation is similar to that of the above second embodiment.

The sampling times data $D_{062}$ is supplied to the data addition circuit 2a, the sampling command circuit 3a, and the data storage selector 5. In the sampling command circuit 3a, in place of the data $D_{061}$ in FIG. 16, the data $D_{062}$ is supplied. Similarly in the data storage selector 5, in place of the data $D_{061}$ in FIG. 11, the data $D_{062}$ is supplied.

FIG. 26 shows a time chart, for the third embodiment, of the sampling-completed flag $S_{011}$, output data $D_{051}$, of the data storage selector 5, output data $D_{032}$ of the sampled data storage circuit 4a, output data $D_{022}$ of the addition circuit 2a, maximum value $D_{081}$ detected by the maximum value detection circuit 7, and minimum value $D_{091}$ detected by the minimum value detection circuit 8. The input flag $S_{041}$ is 1, and so when the $2^I+2$ sampling times of sampling operations are completed, the maximum value $D_{081}$=E and minimum value $D_{091}$=F are subtracted from an addition result $D_{032}$=A+D+C.

FIG. 27 shows a time chart, when the data bit width is N=3, with M=3 and I=2 in the third embodiment, of the sampling-start flag $S_{021}$, sampling-completed flag $S_{011}$, input data $D_{001}$, output data $D_{011}$ of sampling circuit 1, output data $D_{051}$ of data storage selector 5, output data $D_{032}$ of sampled data storage circuit 4a, output data $D_{122}$ of selector 23 in the addition circuit 2a, maximum value $D_{081}$ detected by the maximum value detection circuit 7, minimum value $D_{091}$ detected by the minimum value detection circuit 8, and output data $D_{022}$ of the addition circuit 2a. The input flag $S_{041}$ is 1, and the number of sampling times is $2^I+2=6$.

In FIG. 27, the maximum value $D_{081}$ detected by the maximum value detection circuit 7 is 3'b111, that is, the value from output data $D_{051}$ of the data storage selector 5 is 6'b001110. The minimum value $D_{091}$ detected by the minimum value detection circuit 8 is 3'b001, that is, the value from output data $D_{051}$ of the data storage selector 5 is 6'b000010. In the addition circuit 2a, when addition of the data from the six samplings is performed, the output data $D_{122}$ of the selector 22 is the result of addition of the six samples, and is 6'b111000. The computing unit 25 subtracts the maximum value $D_{081}$, and minimum value $D_{091}$ from the output data $D_{122}$=6'b111000 of the selector 22 in response to the coincidence flag $S_{121}$ from the comparator 24. Thus, the output data $D_{022}$=6'b101000 of the computing unit 25 can be obtained and this data is indicated by the six bits of the storage circuits 42[5] to 42[0] of the sampled data storage circuit 4a, and the value 3'b101 of the upper 3 bits is the average value $D_{042}$.

The sampled input data is time series data which changes, and so in some cases may exhibit abnormal maximal and minimal values, as in the case of noise data or similar. If such data is treated as ordinary data and an average value is calculated, depending on the data being processed and the number of samples taken, the average value may depend heavily on such abnormal data, and there is the possibility that the expected average value may not be obtained. However, by means of the averaging circuit of this third embodiment, sampling is executed a number times equal to an arbitrarily set number of sampling times $2^I$, plus the two times required for a maximum value and a minimum value, the maximum value $D_{081}$, and minimum value $D_{091}$ among the sampled data are detected, and by subtracting the maximum value $D_{081}$, and the minimum value $D_{091}$ from the output data $D_{122}$ resulting from addition of $2^I+2$ sampled data values, an average value $D_{042}$ over $2^I$ sampled values can be obtained from the calculation result. Thus, an average value from which abnormal maximum and minimum values are omitted, such as in the case of noise data, can be obtained with good precision from the sampled data.

What is claimed is:

1. A sampled data averaging circuit for sampling input data a plurality of times and calculating an average value of the sampled data, comprising:
   sampling times setting means for setting a number of sampling times;
   sampling means for sampling, at predetermined timing, the input data by the number of sampling times set by said sampling times setting means;
   division means for dividing the sampled data by the number of samplings set by said sampling times setting means, for each time that the data sampling is performed by said sampling means; and
   accumulation means for sequentially accumulating a division result of said division means,
   wherein an average value is obtained from accumulation results of said accumulation means.

2. The sampled data averaging circuit according to claim 1, wherein if the data sampled by said sampling means is N bits (where N is an integer greater than or equal to 1), the division result is N+M bits (where M is an integer greater than or equal to 1), and the number of sampling times set by said sampling times setting means is $2^I$ (where I is an integer greater than or equal to 1, and $I \leq M$), then said division means shifts the sampled data in a lower bit direction by I bits from the upper N+M bits, and sets the remaining bits to 0, to generate the division result of N+M bits, and supplies the division result to said accumulation means.

3. The sampled data averaging circuit according to claim 2, wherein said division means is a data storage selector having N+M selector circuits.

4. The sampled data averaging circuit according to claim 2, wherein said accumulation means accumulates the (N+M)-bit division result, and takes the upper N bits of the accumulation result as the average value.

5. The sampled data averaging circuit according to claim 4, wherein said accumulation means includes a data addition circuit and a sampled data storage circuit, said data addition circuit adds the (N+M)-bit division result to an output of said sampled data storage circuit, and said sampled data storage circuit stores the addition result of said data addition circuit.

6. The sampled data averaging circuit according to claim 2, wherein said accumulation means sets an accumulation initial value with the (N+1)-th bit from the most significant bit being 1 and the remaining bits being 0, so that the average value of the upper N bits is calculated, with the lower M bits of the accumulation result being rounded-off.

7. The sampled data averaging circuit according to claim 1, wherein said sampling means samples, at the predetermined timing, the input data by the number of sampling times set by said sampling times setting means plus two, and
said accumulation means includes:
maximum value detection means for detecting the maximum value of data values which are division results of said division means;
minimum value detection means for detecting the minimum value of data values which are division results of said division means, and
computing means for subtracting said maximum value and said minimum value from a result of accumulation of division results of said division means by the number of sampling times plus two so as to obtain the accumulation result for the number of sampling times.

8. The sampled data averaging circuit according to claim 1, wherein said sampling times setting means inputs an arbitrary data value, and stores the input data value as the number of sampling times.

* * * * *